H. A. COOK.
LEVEL.
APPLICATION FILED FEB. 15, 1921.
1,409,833.
Patented Mar. 14, 1922.
3 SHEETS—SHEET 1.
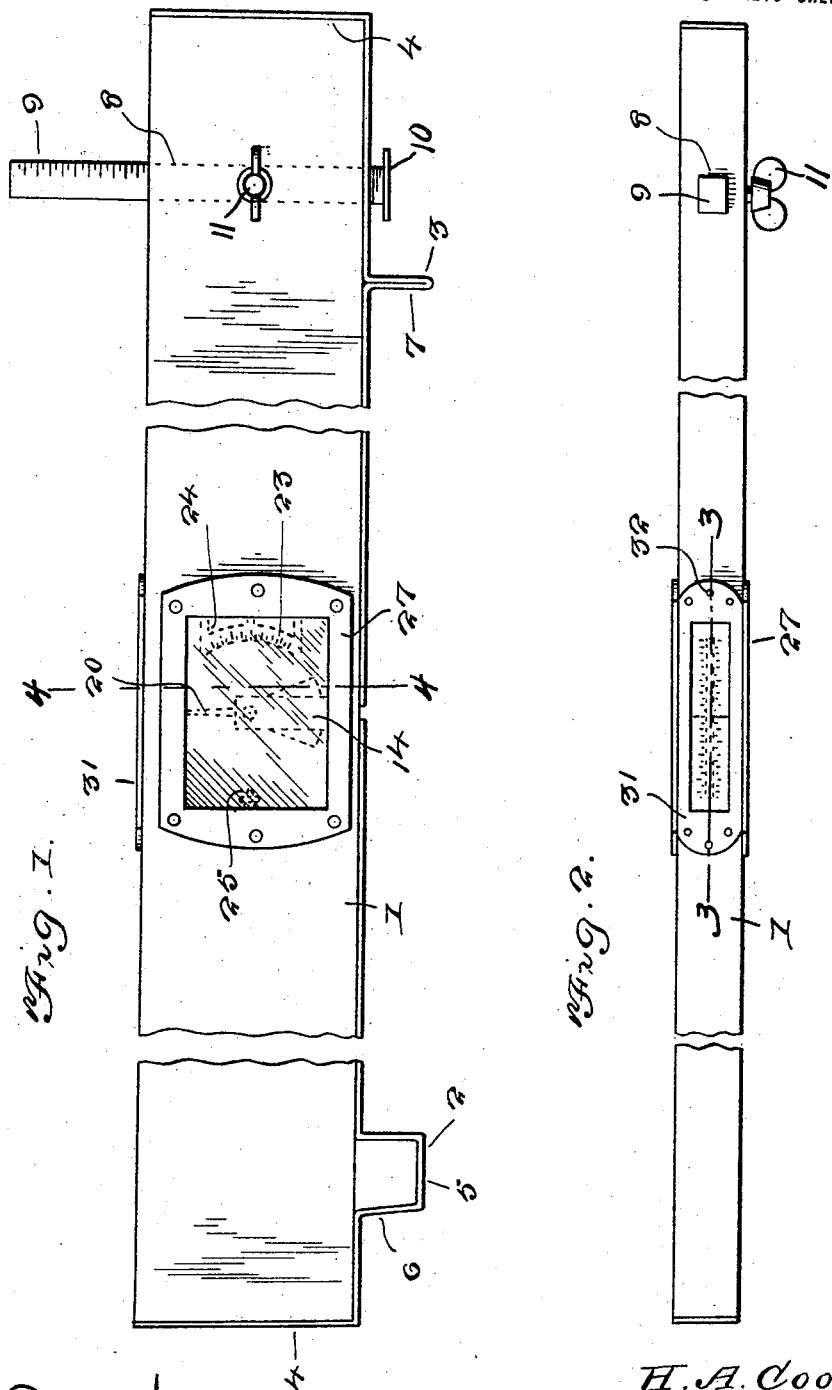

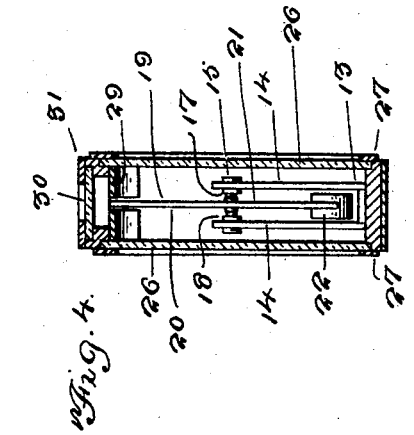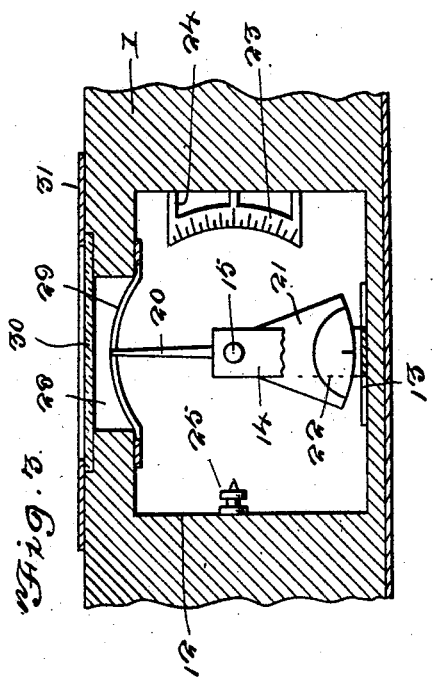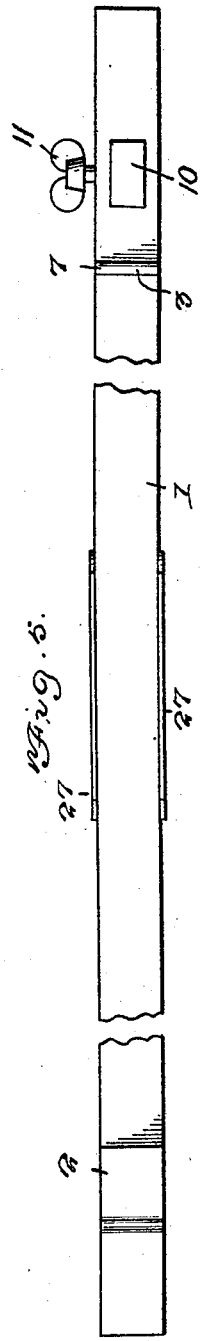

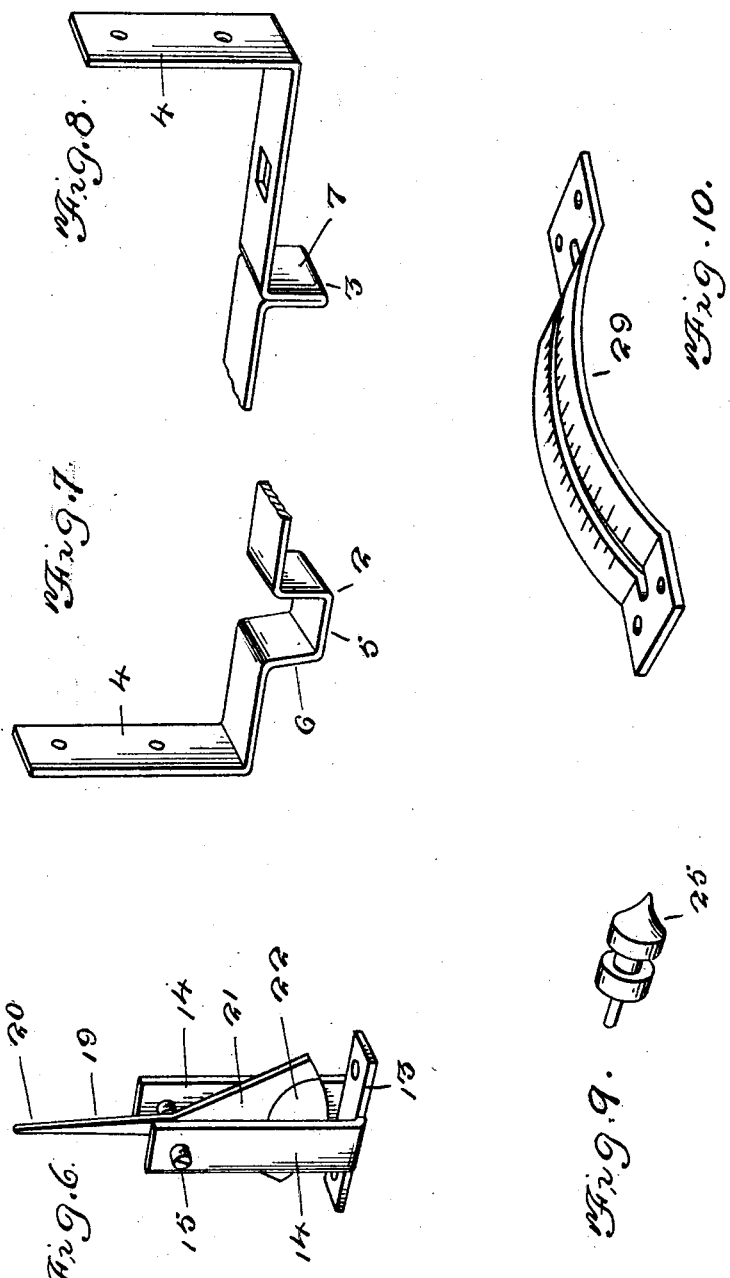

UNITED STATES PATENT OFFICE.

HARRY A. COOK, OF DIXON, NEBRASKA.

LEVEL.

1,409,833.  Specification of Letters Patent.  Patented Mar. 14, 1922.

Application filed February 15, 1921. Serial No. 445,163.

*To all whom it may concern:*

Be it known that I, HARRY A. COOK, a citizen of the United States, residing at Dixon, in the county of Dixon and State of Nebraska, have invented new and useful Improvements in Levels, of which the following is a specification.

My present invention has reference to a combined gauge and level.

My object is the production of a device of this character which can be successfully employed for gauging and leveling the rails of a track and which may be also employed for leveling or plumbing in the ordinary manner.

A further object is the production of a tool of this character which shall embody few simple parts that may be readily associated with the stock of the device, and when so positioned will perform their functions with ease and with certainty.

The foregoing, and other objects which will appear as the nature of the invention is better understood, may be accomplished by a construction, combination and operative arrangement of parts, such as is disclosed by the drawings which accompany and which form part of this application.

In the drawings:

Figure 1 is a side elevation showing the improvement in the nature of a combined level and track gauge.

Figure 2 is a top plan view thereof.

Figure 3 is a sectional view on the line 3—3 of Figure 2.

Figure 4 is a sectional view on the line 4—4 of Figure 1.

Figure 5 is a bottom plan view of the improvement.

Figure 6 is a view in perspective of the level or indicator and the mounting therefor.

Figure 7 is a perspective view of one of the track gauge attachments for the stock.

Figure 8 is a similar view of the second track gauge attachment.

Figure 9 is a view of the plumb point.

Figure 10 is a view of the graduated top plate for the indicator.

The stock of my improvement is indicated by the numeral 1. When the improvement is employed for gauging and leveling the rails of a railway system, the stock may be of a greater length than when the same is employed in connection with building operations or the like.

When employed as a gauge and level for tracks, I secure on the under face of the stock gauge members, indicated by the numerals 2 and 3 respectively. These gauge members are made of hardened steel, and have angle ends 4 that extend over the ends of the stock and are secured thereto. The projecting portion 5 of the gauge 2 is approximately $1\frac{1}{2}$ inches deep, $1\frac{1}{4}$ inches wide at the base thereof and has a taper, approximately $\frac{1}{16}$ of an inch from the base proper of the gauge to the outer end thereof, the tapered portion being indicated by the numeral 6. This arrangement will prevent the wedging or fastening of the gauge when in use. The projection is employed in spiking guard rails at frog points to the proper gauge, the outside of the projection measuring about $2\frac{1}{4}$ inches from the end of the stock.

The gauge 3 has a projection 7 which is about $1\frac{1}{2}$ inches deep and $\frac{1}{4}$ of an inch wide. This projection or finger 7 is not tapered and is arranged approximately 6 inches from the outside thereof to the end of the stock. These proportions are based on the stock being of a length 5 feet, 5 inches, 5 inches wide, and $1\frac{1}{2}$ inches in thickness. The distance between the projections or fingers of the respective gauges is thus 4 feet, $8\frac{1}{2}$ inches from outside to outside. The straight finger 7 of the gauge 3 allows the placing of one finger outside of the rail, so that the use of the level, hereinafter to be described, will not be interfered with. The securing means for the gauges may be in the nature of bolts and rivets, and the body portions of the said gauges extend along the stock, but are spaced at their confronting ends to allow for expansion.

The stock 1 has an opening therethrough in a line with but transversely of the body portion of the gauge 3. This opening is indicated by the numeral 8, and receives therethrough a slide scale 9, the scale having its outer end provided with a head 10, and the said scale is retained adjustable in the slot or opening by the binding engagement thereagainst of a thumb screw 11 that has its shank received in a transverse opening in the stock. The purpose of the slide scale or rule 9 as is well known in the art, is employed for retaining the stock at a desired position when the main rail or frog rail or siding rail in a line with the gauge 3, are to be elevated.

The stock 11 has a central substantially rectangular transversely arranged opening 12 therethrough. On the lower wall provided by this opening there is secured the body plate 13 of a bracket. The bracket has at its edges oppositely disposed upstanding ears 14, provided with the aligning openings which may be threaded for the reception of the threaded body portions 15 of bearings. The threaded body members 15 have their confronting ends provided with pockets for the reception of some hardened material, such as agates or the like, the said agates having their outer faces provided with conical depressions to receive the cone-shaped pins 17 on the ends of the shaft 18 of the indicator 19. The indicator comprises a body member that has one of its ends formed with a V-shaped projection in the nature of a finger 20, and the portion thereof extending in the opposite direction with respect to the shaft 18 is also substantially V-shaped, but the edges thereof extend at outward angles from the center of the body, and the edge of this portion, which is indicated by the numeral 21, is rounded. The rounded edge 21 has a concavity that provides a pocket for a weight 22. In the pocket provided by the transverse opening 12 in the stock there is secured an arched degree scale 23. Preferably the inner edges of the scale have projecting portions in the nature of fingers 24, and these fingers enter the end wall of the pocket 12.

In a line with the axial center of the bearing for the indicator, and on the wall of the pocket opposite that provided with the degree scale 23 there is a pointer 25. This pointer has its outer end substantially cone-shaped, and is arranged directly opposite the central zero mark on the scale 23.

The pocket 12 has its sides closed by transparent plates 26, the latter being secured on the sides of the stock by flat frames 27, said frames being removably secured to the stock by screws or the like.

The top or outer edge of the stock has a central slot or opening 28 that communicates with the pocket 12, and in this opening there is secured a bifurcated oval-shaped scale plate 29, the pointer or finger of the indicator being of a length to enter the central slot in the bifurcated plate so that the degree mark on either side of the said plate may be read in connection with the said pointer or finger. The opening in the top of the stock is closed by a transparent plate 30, the said plate being held on the stock by a slotted plate or frame 31 that is arranged over the said plate, the frame being removably secured to the stock by screws or the like, indicated by the numeral 32.

It is believed that the use of the instrument, in connection with a gauging and leveling rails of a railway system will be perfectly understood. The gauges 2 and 3 may be removable from the stock when the same is employed for leveling or plumbing walls or the like, but as the fingers of the said gauges are of the same length, the removal of the said gauge members is not an absolute necessity. The weighted indicator will at all times hold the finger at the degree mark on the scale plate 29, when the stock is arranged horizontally, and on the scale 23, when the stock is arranged vertically. The plumb point being arranged directly opposite the zero mark on the scale 23, is disposed directly opposite the weighted end or in a line with the pointer of the indicator 19, when the stock is in vertical position, and when the stock is in horizontal or angular position, the plumb point being directed, as stated, to the said degree mark of the scale, will permit of the operator determining the degrees of angle in accordance with the position of the indicator by reading through the transparent plates on the sides of the stock, and it is believed that the foregoing description, when taken in connection with the drawings will fully set forth the simplicity and advantages of the improvement without further detailed description.

When the level is employed for mechanics' use, the same is provided with transparent sides and a top, while for use on railroads the same is provided with a transparent top only. Also while I have illustrated the weighted end of the indicator as removable, the same may, of course, be made integral with the indicator proper, and in a like manner various other changes and modifications may be made from the showing and description as fall within the scope of what is claimed.

Having described the invention, I claim:—

A stock having a recess, a weight influenced indicator pivotally supported therein, an arched scale to one side of the indicator, a pointer to the opposite side of the indicator, a flat degree scale above the indicator, and said stock having sight openings for the scales, pointer and indicator.

In testimony whereof I affix my signature.

HARRY A. COOK.